United States Patent
Pearl et al.

(10) Patent No.: US 9,668,298 B1
(45) Date of Patent: May 30, 2017

(54) NETWORK-ENABLED USER DEVICE CHARGER

(71) Applicant: Amazon Technologies, Inc., Reno, NV (US)

(72) Inventors: Josh Pearl, Cambridge, MA (US); Andrew Dean Christian, Lincoln, MA (US); Jennifer Nicole Loomis, Cambridge, MA (US); Donald Gillespie, Cambridge, MA (US); Tristam Kyle MacDonald, Cambrige, MA (US)

(73) Assignee: Amazon Technologies, Inc., Reno, NV (US)

( * ) Notice: Subject to any disclaimer, the term of this patent is extended or adjusted under 35 U.S.C. 154(b) by 461 days.

(21) Appl. No.: 14/227,899

(22) Filed: Mar. 27, 2014

(51) Int. Cl.
*H04W 88/00* (2009.01)
*H04W 84/12* (2009.01)
*H02J 7/02* (2016.01)

(52) U.S. Cl.
CPC .......... *H04W 88/005* (2013.01); *H02J 7/025* (2013.01); *H04W 84/12* (2013.01)

(58) Field of Classification Search
CPC .............. H04W 88/005; H04W 84/12; H04W 52/0261; H04W 52/0264; H04W 52/0267; H04W 52/027; H04W 52/0274; H04W 52/0277; H04W 52/028; H04W 52/0283; Y02B 60/1278; Y02B 60/1282; Y02B 60/1285; Y02B 60/1289; Y02B 60/1292; Y02B 60/1296; Y02B 60/50
See application file for complete search history.

(56) References Cited

U.S. PATENT DOCUMENTS

| 7,716,425 | B1* | 5/2010 | Uysal ................ | G06F 12/0862 711/137 |
| 2005/0245245 | A1* | 11/2005 | Sorvari ............... | G06F 1/3203 455/418 |
| 2008/0272889 | A1* | 11/2008 | Symons ............... | H02J 7/025 340/10.1 |
| 2011/0163713 | A1* | 7/2011 | Wang ................. | H02J 7/025 320/108 |
| 2013/0084800 | A1* | 4/2013 | Troberg .............. | H04B 5/0037 455/41.1 |
| 2014/0040582 | A1* | 2/2014 | Attarde ............... | G06F 11/1453 711/162 |

(Continued)

*Primary Examiner* — Ian N Moore
*Assistant Examiner* — Latresa McCallum
(74) *Attorney, Agent, or Firm* — Eversheds Sutherland (US) LLP

(57) ABSTRACT

A WiFi-enabled user device charger is disclosed that may include a processor, a WiFi antenna, a connector for receiving power, a user device charging and data transmission connector, and a memory storing computer-executable instructions configuring the processor to connect to a server using the WiFi antenna to fetch data; queue a portion of the data to transfer to the user device; determine that the user device is connected to the WiFi-enabled user device charger; transmit at least a portion of the data to the user device using the device charging and data transmission connector; and transfer power to the user device using the device charging and data transmission connector. The WiFi-enabled user device charger may not provide any functionality that is not related to charging the user device or transferring data between the user device and the server.

17 Claims, 4 Drawing Sheets

(56) References Cited

U.S. PATENT DOCUMENTS

| | | | |
|---|---|---|---|
| 2014/0075169 A1* | 3/2014 | Andrews | G06F 9/4416 |
| | | | 713/2 |
| 2014/0082046 A1* | 3/2014 | Tal | H04L 43/0882 |
| | | | 709/203 |
| 2014/0082732 A1* | 3/2014 | Britton | G06F 21/56 |
| | | | 726/24 |

* cited by examiner

NETWORK-ENABLED USER DEVICE CHARGER

BACKGROUND

Users are increasingly utilizing user devices, such as tablets and smartphones, in many different environments and can access data over cellular networks from virtually anywhere. In many instances, the cost associated with downloading or accessing data outside of a local wireless network may be expensive and time-consuming, especially if there are many people attempting to do the same thing at the same time. The cellular network may have bandwidth issues and the user may not be able to obtain data quickly in response to a request for content. Additionally, when the user has requested data, they may want to view or interact with the content immediately, but the size of the requested content may prohibit the user from immediate access, as the user device may require time to download the requested data.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

Figure 1:
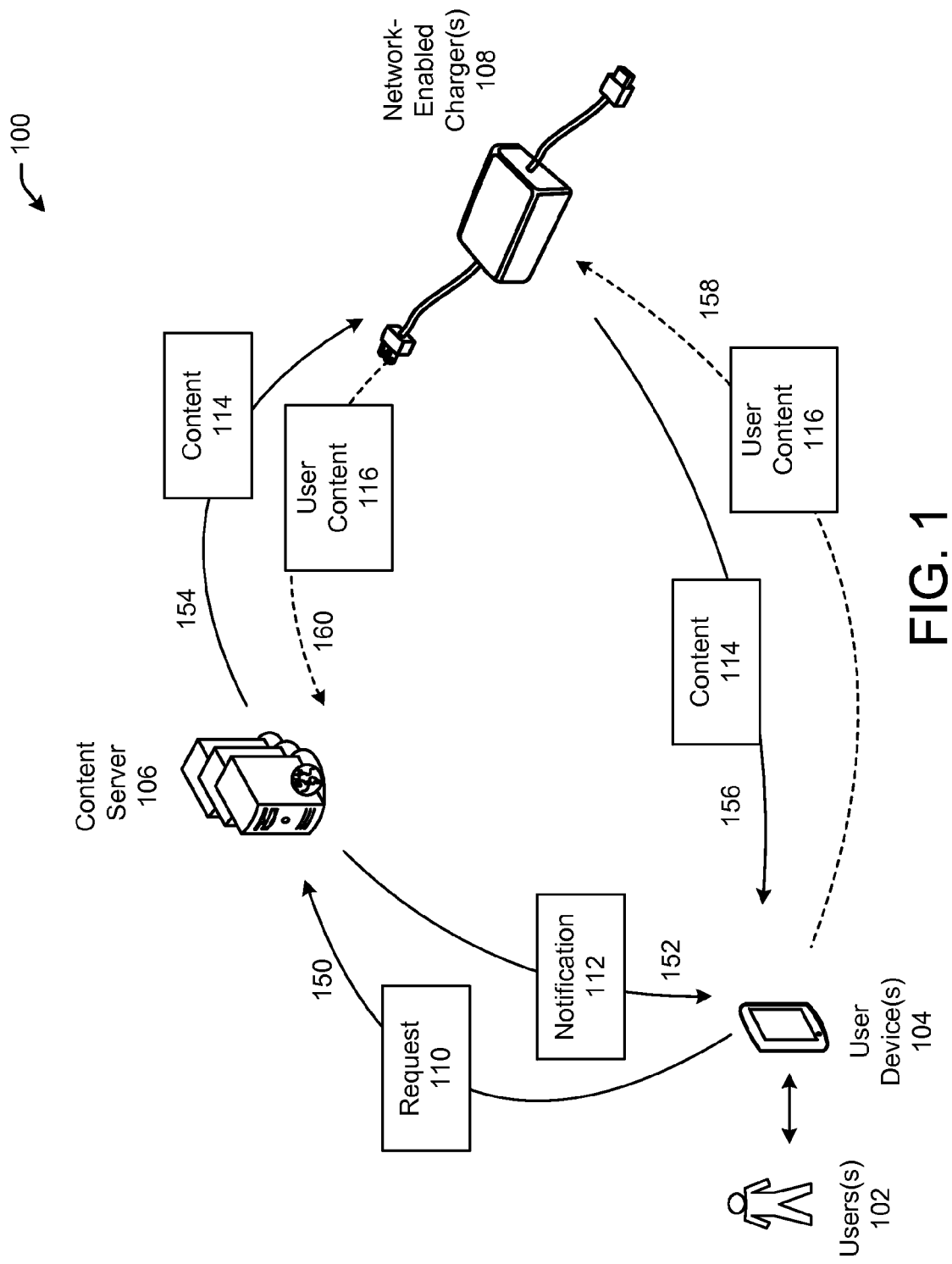
FIG. 1 depicts an illustrative data flow between various components of an illustrative system architecture for a network-enabled user device charger in accordance with one or more embodiments of the disclosure.

This disclosure relates to, among other things, systems, methods, computer-readable media, techniques and methodologies for a network-enabled user device charger. The network-enabled user device charger may include built-in connectivity capabilities to a wireless network and contain embedded storage for storing data, such as multimedia content, games, documents, and the like. Although any type of network may be used with a network-enabled user device charger, and embodiments are not limited to any type of network, a WiFi network will be used as an example herein.

In some embodiments, the network-enabled user device charger may include embedded storage. The storage may be used, for example, to store data received from a remote server. The data may then be transmitted to the user device while it is connected to the network-enabled user device charger as it is being charged. In some embodiments, the data stored in the data storage may be transmitted to the user device over a wireless network. The network-enabled user device charger may include one or more processors, an antenna, data storage, and a connector (e.g., universal serial bus (USB) plug). In some embodiments, the connector mounted on the user device may be called a receptacle and the connector attached to the network-enabled user device charger may be called a plug. The receptacle is designed to be connected to the plug where the plug is inserted into the receptacle. When the plug is inserted into the receptacle, data may be transmitted between the user device and the network-enabled user device charger. Additionally, when the plug of the network-enabled user device charger is inserted into the receptacle of the user device, power may be transmitted from the network-enabled user device charger to the user device. The antenna of the network-enabled user device charger may run along the length of a cable of the charger to maximize the wireless reception of the charger. In some embodiments, the necessary hardware may be enclosed in a housing of the network-enabled user device charger. In some embodiments, the network-enabled user device charger may have connectivity capabilities initiated with near field communication (NFC) if the connected user device is capable of induction charging.

In some embodiments, the network-enabled user device charger may be associated with a cloud-based web application to configure all the settings and interact with the software capabilities of the charger. The network-enabled user device charger may also be associated with a user device based application to configure all the settings and interact with a set of software capabilities of the charger. The cloud-based web application and/or the user device based application may include the capability to configure network settings associated with the charger, register one or more user accounts in association with the charger, and/or present any data or metrics obtained and/or generated by the charger. In some embodiments, the data for the network-enabled user device charger may be stored in the cloud and all data transfers may occur at times to optimize data flow to and/or from the user device and/or the cloud.

In some embodiments, the cloud-based web application and/or user device based application may have the ability to queue content to synchronize from the cloud to the network-enabled user device charger and to configure manual or automatic throttle of data transfers over the wireless network. In some embodiments, the data may be throttled based on off peak hours. In some embodiments, the data may be synchronized wirelessly if the user device is present on the same wireless network as the network-enabled user device charger.

In some embodiments, the network-enabled user device charger may be associated with multiple user accounts and may be able to detect specific devices, which may permit the charger to identify which device is connected and synchronize and/or fetch data from a server based on preferences associated with the specific user device.

In some embodiments, the network-enabled user device charger may have multiple device capabilities for the charger to serve the same function for multiple devices potentially, but not necessarily across multiple user accounts. For instance, the network-enabled user device charger may have the ability to support a single or multiple devices across the same wireless network. The network-enabled user device charger may have the ability to support a single or multiple devices across the Internet.

In some embodiments, the network-enabled user device charger may have capabilities for predictive downloads based on charger location (e.g., based on the wireless network to which it is connected) and time-of-day usage history associated with a user. For example, the network-enabled user device charger may download certain types of content on a charger connected to a "work" wireless network but allow all downloads when connected to the "home" wireless network.

In some embodiments, the network-enabled user device charger may include a travel mode. For example, a network configuration (e.g., WiFi configuration) may be pushed from a user device to the charger. In some embodiments, the network-enabled user device charger may permit tagging wireless networks for particular uses. In some embodiments, the network-enabled user device charger may be associated with rules that may have been established via the cloud-based web application or user device based application to prevent product updates over unknown networks. Additionally, the applications may provide the ability to monitor different metrics associated with the network-enabled user device charger, such as wireless connection stability and electricity stability.

In some embodiments, the uses of the network-enabled user device charger may be centered around large data transfers (e.g., downloads, uploads). Such uses may include a preloading "over the air" device updates onto the charger, backup and restore capabilities for the user device, synchronizing content from the user device with one or more remote servers, reducing reliance on cellular data providers, and/or predictive identification of content for the user.

Preloading "over the air" device updates onto the charger may include downloading any updates for a connected user device by the charger and applying the updates to the user device at a specific time, allowing for all connected devices to receive the update without having to wait for a large download.

Backup and restore capabilities may include the network-enabled user device charger storing a copy of all data from the user device. The data may be backed up from the user device to the charger at fast speeds via the connection to the charger, which may allow for more complete and faster backups to occur. The backups may then be asynchronously transferred to the cloud and accessible for restoration should the need arise Synchronizing content may include synchronizing the content between the user device and the user accounts by downloading data from the cloud and transferring the data to the user device when connected to the network-enabled user device charger. Data may also be transferred from the user device to the cloud (e.g., pictures taken using the user device) when the user device is connected to the network-enabled user device charger.

Reducing reliance on cellular data providers may include determining which downloads may wait for the next device charge and queuing those requests for download to the charger for an eventual user device synchronization. For example, if a user purchases ten books on their user device prior to going on vacation, the books may be queued up and downloaded to the charger to synchronize with the user device since the customer will not intend to read the books until their departure. Such decisions may reduce unnecessary burden and cost to a wireless data network.

Predictive identification of content for a user may include the preloading of content to a network-enabled user device charger without taxing the user device. The content that has been predicted as likely to be consumed by the user may be preloaded to the network-enabled user device charger. For example, if the user watches the first three episodes of a television series, then a prediction may be made that they will watch the fourth episode. The fourth episode may be proactively sent to the charger which may then transmit the fourth episode to the user device without explicit instructions for content from the user. Predictive identification of content may facilitate data synchronization across multiple devices for file sharing and full device recovery.

In some embodiments, the network-enabled user device charger may be pre-loaded with software updates, where the charger may be preloaded with updates that can be installed on a user device as soon as the user device is plugged in to the charger for the first time.

Various illustrative embodiments have been discussed above. These and other example embodiments of the disclosure will be described in more detail hereinafter through reference to the accompanying drawings. The drawings and the corresponding description are provided merely for illustration and are not intended to limit the disclosure in any way. It should be appreciated that numerous other embodiments, variations, and so forth are within the scope of this disclosure.

Illustrative Use Cases and System Architecture

FIG. 1 depicts an illustrative data flow between various components of an illustrative system architecture for a network-enabled user device charger in accordance with one or more embodiments of the disclosure. One or more illustrative user device(s) 104 operable by one or more users 102 are illustratively depicted in FIG. 1 The user device(s) 104 may include any suitable device capable of receiving and transmitting data and communicating with other computing devices. The user device(s) 104 may include any suitable processor-driven computing device including, but not limited to, a laptop computing device, a tablet device, a desktop computing device, smartphone or other cellular device, a gaming console, a multimedia content streaming device, a set-top box, wearable computing, and so forth. For ease of explanation, the user device(s) 104 and the user(s) 102 may be described herein in the singular; however, it should be appreciated that multiple user device(s) 104 operable by multiple users 102 may be provided.

One or more illustrative user device(s) 104 operable by one or more users 102 are illustratively depicted in FIG. 1. At exchange 150, the user device(s) 104 may communicate with one or more content server(s) 106 to request content (e.g., transmitting a request 110 for content 114). The content 114 may include, but is not limited to, software updates, multimedia content, movies, music, videos, games, documents, or the like. The content server 106 may determine that the content 114 has already been fetched by the network-enabled charger 108 (e.g., at exchange 154 and 156). In some embodiments, the content server 106 may have proactively transmitted content 114 to the network-enabled user device charger 108 based at least in part on user account preferences associated with a user 102 of the user device 104, purchase history associated with the user account, predictive analysis associated with the user account, or the like. In some embodiments, the request 110 from the user device 104 may indicate that the content 114 requested does not need to be transmitted to the user device 104 immediately. At exchange 152, based at least in part on the determination that the content 114 has been sent to the network-enabled user device charger 108, the content server may generate a notification 112 and transmit the notification 112 to the user device 104 informing the user 102 of the content 114 available on the network-enabled user device charger 108. In some embodiments, the content server 106, in response to receiving the request 110 from the user device 104 indicating that the requested content 114 does not need to be transmitted to the user device 104 immediately, may transmit the content 114 to the network-enabled charger 108 at exchange 154.

At exchange 154, the content server 106 may transmit content 114 to the network-enabled charger 108 over a wireless connection. The network-enabled charger 108 may establish a connection with the content server 106 in order to receive content 114 from the content server 106. In some embodiments, the network-enabled charger 108 may periodically request information from the content server 106 by transmitting requests or notifications to determine whether any content 114 is queued for transmission from the content server 106 to the network-enabled charger 108. The network-enabled charger 108 may transmit requests and/or notifications to the content server 106 at pre-determined time intervals (e.g., user-defined or set at time of manufacture). In some embodiments, the network-enabled charger 108 may establish a connection to the content sever 106 upon establishing connectivity over a network. Once the connection is established by the network-enabled charger 108, the content server 106 may issue commands and/or transmit content 114 over the connection. In some embodiments, the content server 106 may utilize a back channel (e.g., SMS messages over a cellular network) to notify the network-enabled charger 108 that content is ready for transmission. In response to receiving the notification(s) from the content server 106, the network-enabled charger 108 may establish a connection to the content server 106 over which the content server 106 may transmit content 114 referred to in the back channel notification.

In some embodiments, the content server 106 may transmit content 114 in response to receiving a request 110 from the user device 104. In some embodiments, the content server 106 may proactively identify content 114 that is likely to be requested by the user 102 (e.g., based on user preferences, viewing history, user behavior history, or the like) and may transmit the identified content 114 to the network-enabled charger 108 without any interaction or indication (e.g. receiving a request 110) from the user device 104.

At exchange 156, the network-enabled charger 108 may transmit the content 114 to the user device 104. In some embodiments, the network-enabled charger 108 may transmit the content 114 when the user device 104 is connected to the network-enabled charger 108 for charging the user device 104. In some embodiments, the content 114 may be transmitted from the network-enabled charger 108 via a connector (e.g., universal serial bus (USB) plug) connected to a receptacle of the user device 104 while the user device 104 is connected via the connector for charging. At exchange 158, the user device 104 may transmit user content 116 (e.g., user generated content such as pictures, videos, documents, or the like) to the network-enabled user device charger 108 for backup and storage purposes. For example, the user 102 may want to back up some user content 116 to the network-enabled user device charger 108 so that if the user device 104 loses the user content 116 or it becomes corrupted, then the network-enabled user device charger 108 may quickly restore the user content 116 without having to retrieve the user content 116 from a remote server.

At exchange 160, the network-enabled user device charger 108 may transmit the user content 116 to the content server 106 for back up purposes to ensure the user content 116 may be retrieved from a remote server. In some embodiments, by transmitting the user content 116 to the content server 106, the user content 116 may be available to all user devices 104 associated with a user account, enabling synchronization of data across all the associated devices.

Figure 2:
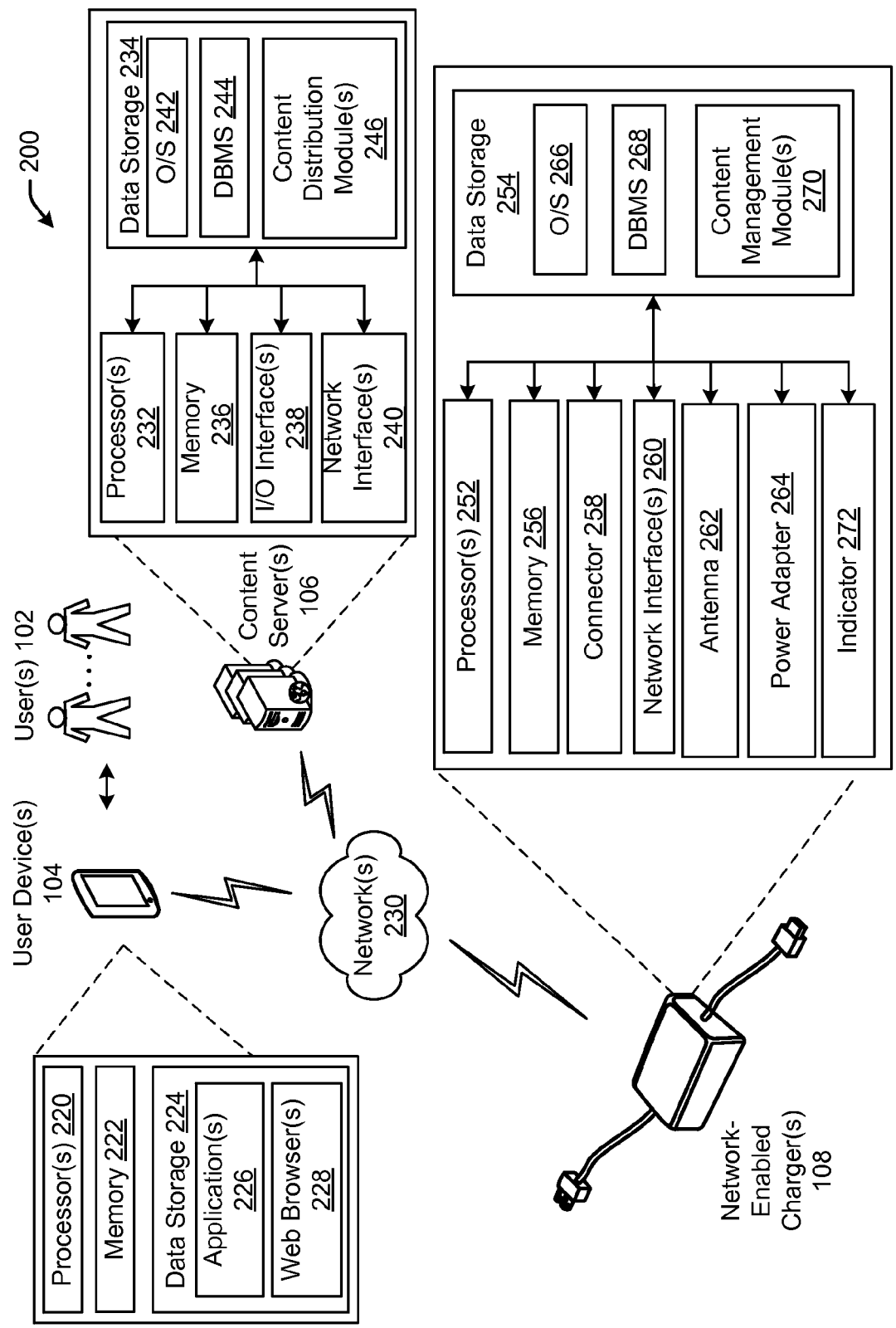
FIG. 2 is a block diagram including various hardware and software components of the illustrative system architecture depicted in FIG. 1 in accordance with one or more embodiments of the disclosure.

FIG. 2 is a block diagram including various hardware and software components of the illustrative system architecture depicted in FIG. 1 in accordance with one or more embodiments of the disclosure. The illustrative architecture 200 may include one or more user device(s) 104 operable by one or more users 102, one or more content server(s) 106 and/or one or more network-enabled charger(s) 108. The user device(s) 104, content server(s) 106, and/or network-enabled charger(s) 108 may include any of the types of devices described through reference to FIG. 1.

Any of the user device(s) 104, content server(s) 106, and/or network-enabled charger(s) 108 may be configured to communicate with each other and any other component of the system architecture 200 via one or more network(s) 230. The network(s) 230 may include, but are not limited to, any one or a combination of different types of suitable communications networks such as, for example, cable networks, public networks (e.g., the Internet), private networks, wireless networks, cellular networks, or any other suitable private and/or public networks. Further, the network(s) 230 may have any suitable communication range associated therewith and may include, for example, global networks (e.g., the Internet), metropolitan area networks (MANs), wide area networks (WANs), local area networks (LANs), or personal area networks (PANs). In addition, the network(s) 230 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

The user device(s) 104 may include one or more processor(s) 220 that may include any suitable processing unit capable of accepting digital data as input, processing the input data based on stored computer-executable instructions, and generating output data. The computer-executable instructions may be stored, for example, in the data storage 224 and may include, among other things, operating system software and application software. The computer-executable instructions may be retrieved from the data storage 224 and loaded into the memory 222 as needed for execution. The processor(s) 220 may be configured to execute the computer-executable instructions to cause various operations to be performed. The processor(s) 220 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 224 may store program instructions that are loadable and executable by the processor(s) 220, as well as data manipulated and generated by the processor(s) 220 during execution of the program instructions. The program instructions may be loaded into the memory 222 as needed for execution. Depending on the configuration and implementation of the user device(s) 104, the memory 222 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 222 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

Various program modules, applications, or the like may be stored in data storage 224 that may comprise computer-executable instructions that when executed by the processor(s) 220 cause various operations to be performed. The memory 222 may have loaded from the data storage 224 one or more operating systems (O/S) that may provide an interface between other application software (e.g., dedicated applications, a browser application, a web-based application, a distributed client-server application, etc.) executing on the user device(s) 104 and the hardware resources of the user device(s) 104. More specifically, the O/S may include a set of computer-executable instructions for managing the hardware resources of the user device(s) 104 and for providing common services to other application programs (e.g., managing memory allocation among various application programs). The O/S may include any operating system now known or which may be developed in the future including, but not limited to, any mobile operating system, desktop or laptop operating system, mainframe operating system, or any other proprietary or open-source operating system.

The data storage 224 may additionally include various other program modules that may include computer-executable instructions for supporting a variety of associated functionality. For example, the data storage 224 may include one or more application(s) 226 and/or one or more web browser(s) 228. In some embodiments, one or more application(s) 226 may be used to request data, such as multimedia content, games, documents, or the like. In some embodiments, a user 102 may launch a web browser 228 to communicate and/or exchange information with one or more content server(s) 106. The web browser 228 may be used to access a cloud-based web application. The cloud-based web application may be accessed by the user 102 to configure settings associated with the network-enabled user device charger 108, including but not limited to associating a user account with the network-enabled user device charger 108, present and/or generate metrics associated with the network-enabled user device charger 108, queue data (e.g., multimedia content, games, documents, etc.) to synchronize from the cloud to the network-enabled user device charger 108 or vice versa, configure manual or automatic throttle settings of data transfers over a wireless network 230, and/or setting the network-enabled user device charger 108 to synchronize data wirelessly with the user device 104 if the user device 104 is present on the same wireless network 230 as the network-enabled user device charger 108. In some embodiments, the network-enabled user device charger 108 may be associated with multiple user accounts and may be able to detect specific user devices 104 (e.g., user device profiles), which may permit the charger 108 to identify which device 104 is connected and synchronize and/or fetch data based on preferences associated with the specific user device 104 configured via the web-based cloud application or the user application 226.

In some embodiments, the network-enabled user device charger 108 may be able to support a single or multiple devices across the same wireless network 230 or the Internet. In some embodiments, the network-enabled user device charger 108 may include capabilities for predictive downloads based on a location of the network-enabled user device charger 108 and time-of-day usage history associated with a user 102. For example, the network-enabled user device charger 108 may download certain types of content 114 on a charger physically located at a "work" location but allow all downloads at the "home" charger. In some embodiments, the network-enabled user device charger 108 may include a global positioning system (GPS) device which may detect an approximate location of the network-enabled user device charger 108. In some embodiments, the network-enabled user device charger 108 may determine a location based on the available wireless networks. How to determine the location of the network-enabled user device charger 108 may be configured via the web-based cloud application accessed via the web browser 228 and/or the user application 226 executing on the user device 104.

In some embodiments, the location of the network-enabled user device charger 108 may be determined based at least in part on the wireless network to which it is connected. For example, a user 102 may specify that a network 230 available at a "home" location may allow all downloads to the network-enabled user device charger 108, whereas, if the network-enabled user device charger 108 is connected to a network 230 associated with a "work" location, only certain types of downloads (e.g., specific type of content or size of content) may be permitted. The network-enabled user device charger 108 may determine an identifier of a network to which it is connected and select data to transfer to the user device using the identifier of the network.

In some embodiments, the network-enabled user device charger 108 may include a travel mode, permitting a user 102 to push a network configuration from a user device 104 to the charger 108 via the application 226 or web-based cloud application. In some embodiments, the application 226 or web-based cloud application may be used to tag networks 230 for particular uses. In some embodiments, network-enabled user device charger 108 may be associated with rules that may have been established via the cloud-based web application or user device based application 226 to prevent product updates over unknown networks. Additionally, the application 226 or web-based cloud application may provide the ability to monitor different metrics associated with the network-enabled user device charger 108, such as wireless connection stability and electricity stability.

The content server(s) 106 may include one or more processors (processor(s)) 232 and one or more memories 236 (referred to herein generically as memory 236). The processor(s) 232 may include any suitable processing unit capable of accepting digital data as input, processing the input data based on stored computer-executable instructions, and generating output data. The computer-executable instructions may be stored, for example, in the data storage 234 and may include, among other things, operating system software and application software. The computer-executable instructions may be retrieved from the data storage 234 and loaded into the memory 236 as needed for execution. The processor(s) 232 may be configured to execute the computer-executable instructions to cause various operations to be performed. The processor(s) 232 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 234 may store program instructions that are loadable and executable by the processor(s) 232, as well as data manipulated and generated by the processor(s) 232 during execution of the program instructions. The program instructions may be loaded into the memory 236 as needed for execution. Depending on the configuration and implementation of the content server(s) 106, the memory 236 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 236 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The content server(s) 106 may further include additional data storage 234 such as removable storage and/or non-removable storage including, but not limited to, magnetic storage, optical disk storage, and/or tape storage. Data storage 234 may provide non-volatile storage of computer-executable instructions and other data. The memory 236 and/or the data storage 234, removable and/or non-removable, are examples of computer-readable storage media (CRSM).

The content server(s) 106 may further include network interface(s) 240 that facilitate communication between the content server(s) 106 and other devices of the illustrative system architecture 200 (e.g., user device(s) 104, network-enabled charger 108, etc.) or application software via the network(s) 230. The content server(s) 106 may additionally include one or more input/output (I/O) interfaces 238 (and optionally associated software components such as device drivers) that may support interaction between a user and a variety of I/O devices, such as a keyboard, a mouse, a pen, a pointing device, a voice input device, a touch input device, a display, speakers, a camera, a microphone, a printer, and so forth.

Referring again to the data storage 234, various program modules, applications, or the like may be stored therein that may comprise computer-executable instructions that when executed by the processor(s) 232 cause various operations to be performed. The memory 236 may have loaded from the data storage 234 one or more operating systems (O/S) 242 that may provide an interface between other application software (e.g., dedicated applications, a browser application, a web-based application, a distributed client-server application, etc.) executing on the content server(s) 106 and the hardware resources of the content server(s) 106. More specifically, the O/S 242 may include a set of computer-executable instructions for managing the hardware resources of the content server(s) 106 and for providing common services to other application programs (e.g., managing memory allocation among various application programs). The O/S 242 may include any operating system now known or which may be developed in the future including, but not limited to, any mobile operating system, desktop or laptop operating system, mainframe operating system, or any other proprietary or open-source operating system.

The data storage 234 may further include one or more database management systems (DBMS) 244 for accessing, retrieving, storing, and/or manipulating data stored in one or more datastores. The DBMS 244 may use any of a variety of database models (e.g., relational model, object model, etc.) and may support any of a variety of query languages.

The data storage 234 may additionally include various other program modules that may include computer-executable instructions for supporting a variety of associated functionality. For example, the data storage 234 may include one or more content distribution module(s) 246. The content distribution module(s) 246 may include computer-executable instructions that in response to execution by the processor(s) 232 cause operations to be performed including facilitating preloading "over the air" device updates onto the charger 108, which may include downloading any updates for a connected user device 104 by the charger 108 and applying the update to the user device 104. The content distribution module(s) 246 may include computer-executable instructions that in response to execution by the processor(s) 232 cause operations to be performed including backup and restore capabilities which may include storing a copy of all data from the user device 104. The data may be backed up from the user device 104 to the data storage 254 of the network-enabled user device charger 108 at faster speeds via the connection to the charger 108 (e.g., via wireless network 230 or connector 258) than over a wireless network 230, which may allow for more complete and faster backups to occur. The backups may then be asynchronously transferred to the cloud and accessible for restoration should the need arise.

The content distribution module(s) 246 may include computer-executable instructions that in response to execution by the processor(s) 232 cause operations to be performed including synchronizing content between the user device 104 and the content server(s) 106 in association with user accounts associated with the user 102 by downloading data from the cloud and transferring the data to the device 104 when connected to the network-enabled user device charger 108. Data may also be transferred from the network-enabled user device charger 108 to the cloud (e.g., pictures taken using the user device).

The content distribution module(s) 246 may include computer-executable instructions that in response to execution by the processor(s) 232 cause operations to be performed including reducing reliance on cellular data providers which may include determining which downloads may wait for the next device charge and queuing those requests for download to the charger 108 for an eventual user device synchronization. For example, if a user 102 purchases content (e.g., movies, music, e-books, etc.) on their user device 104 (via application 226 or the web browser 228), the content may be queued up and downloaded to the charger 108 to synchronize with the device 104 at a later time when the network-enabled charger 108 is connected to a wireless network rather than a cellular network. Such decisions may reduce unnecessary burden and cost to a wireless data network.

The content distribution module(s) 246 may include computer-executable instructions that in response to execution by the processor(s) 232 cause operations to be performed including predictive pre-caching of content may include preloading of content to the network-enabled user device charger 108 and then the user device 104 without taxing the user device 104. The content that has been predicted as likely to be consumed by the user 102 may be preloaded to the network-enabled charger 108. For example, if the user 102 watches the first three episodes of a television series, then a prediction may be made by the content distribution module 246 that the user 102 will watch the fourth episode. The fourth episode may be proactively transmitted to the charger 108 which may then transmit the fourth episode to the user device 104 without explicit instructions for content from the user 102. Predictive pre-caching of content may facilitate data synchronization across multiple devices 104 for file sharing and full device recovery.

The content distribution module(s) 246 may include computer-executable instructions that in response to execution by the processor(s) 232 cause operations to be performed including facilitating installation of software updates, where the charger 108 may be preloaded with updates that can be installed on a user device 104 as soon as the user device 104 is plugged in to the charger 108 for the first time.

Within the data storage 234, one or more modules may be stored. As used herein, the term module may refer to a functional collection of instructions that may be executed by the one or more processor(s) 232. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

The network-enabled user device charger 108 may include one or more processors (processor(s)) 252 and one or more memories 256 (referred to herein generically as memory 256). The processor(s) 252 may include any suitable processing unit capable of accepting digital data as input, processing the input data based on stored computer-executable instructions, and generating output data. The computer-executable instructions may be stored, for example, in the data storage 254 and may include, among other things, operating system software and application software. The computer-executable instructions may be retrieved from the data storage 254 and loaded into the memory 256 as needed for execution. The processor(s) 252 may be configured to execute the computer-executable instructions to cause various operations to be performed. The processor(s) 252 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 254 may store program instructions that are loadable and executable by the processor(s) 252, as well as data manipulated and generated by the processor(s) 252 during execution of the program instructions. The program instructions may be loaded into the memory 256 as needed for execution. Depending on the configuration and implementation of the network-enabled user device charger 108, the memory 256 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 256 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The network-enabled user device charger 108 may further include additional data storage 254 such as removable storage and/or non-removable storage including, but not limited to, magnetic storage, optical disk storage, and/or tape storage. Data storage 254 may provide non-volatile storage of computer-executable instructions and other data. The memory 256 and/or the data storage 254, removable and/or non-removable, are examples of computer-readable storage media (CRSM).

The network-enabled user device charger 108 may further include network interface(s) 260 that facilitate communication between the user device(s) 104 and other devices of the illustrative system architecture 200 (e.g., user device(s) 104, content server(s) 106, etc.) or application software via the network(s) 230.

The network-enabled user device charger 108 may include a connector 258 (e.g., universal serial bus (USB) plug). The connector 258 may enable the network-enabled user device charger 108 to charge a user device 104 connected to the network-enabled user device charger 108 via the connector 258. Additionally, the connector 258 may be used to transmit data between the user device 104 and the network-enabled user device charger 108. In some embodiments, the connector 258 may be a plug that is to be inserted into a receptacle of the user device 104.

The network-enabled user device charger 108 may include an antenna 262. In some embodiments, the antenna 262 may be positioned along the length of the network-enabled user device charger 108 to maximize wireless reception. The antenna 262 may facilitate transmission and receipt of data over a wireless network.

The network-enabled user device charger 108 may include a power adapter 264. The power adapter 264 may include an alternating current to direct current (AC/DC) converter. The AC/DC converter may convert electric power from a power source, such as an alternating current (AC) wall socket. The network-enabled user device charger 108 may include a housing that encloses the internal components of the power adapter 264, such as the AC/DC converter, the processor(s) 252, memory 256, network interface(s) 260, antenna 262, and/or data storage 254. The network-enabled user device charger 108 may be coupled to a power plug and/or a connector 258. In some embodiments, the connector 258 may be a micro A USB plug, a micro B USB plug, a USB Mini A plug, a USB Mini B plug, a standard A USB plug, or a standard B USB plug. In some embodiments, the connector 258 may be a FireWire plug, an Ethernet plug, a MIDI plug, an eSATA or eSATAp connector, a Thunderbolt connector, or a Lightning connector.

In some embodiments, the power plug may be coupled to the network-enabled user device charger 108 via a cable or may be positioned on the surface of the housing of the network-enabled user device charger 108. In some embodiments, the connector 258 coupled to the network-enabled user device charger 108 via a cable or may be positioned on the surface of the housing of the network-enabled user device charger 108.

In some embodiments, the network-enabled user device charger 108 may include an indicator 272. For example, the indicator may be a visual indicator, such as one or more colored lights (e.g., LED lights) to indicate whether content 114 is available on the network-enabled user device charger 108 and ready to be downloaded to the user device 104. In some embodiments, the indicator 272 may be an audio indicator, such as a speaker that is capable of emitting noise to indicate whether content 114 is available on the network-enabled user device charger 108 and ready to be downloaded to the user device 104. In some embodiments, the indicator 272 may be a graphical display that may depict one or more icons, words, or other indication as to whether content 114 is available on the network-enabled user device charger 108 and ready to be downloaded to the user device 104

Referring again to the data storage 254, various program modules, applications, or the like may be stored therein that may comprise computer-executable instructions that when executed by the processor(s) 252 cause various operations to be performed. The memory 256 may have loaded from the data storage 254 one or more operating systems (O/S) 262 that may provide an interface between other application software (e.g., dedicated applications, a browser application, a web-based application, a distributed client-server application, etc.) executing on the network-enabled user device charger 108 and the hardware resources of the network-enabled user device charger 108. More specifically, the O/S 266 may include a set of computer-executable instructions for managing the hardware resources of the network-enabled user device charger 108 and for providing common services to other application programs (e.g., managing memory allocation among various application programs). The O/S 266 may include any operating system now known or which may be developed in the future including, but not limited to, any mobile operating system, desktop or laptop operating system, mainframe operating system, or any other proprietary or open-source operating system.

The data storage 254 may further include one or more database management systems (DBMS) 268 for accessing, retrieving, storing, and/or manipulating data stored in one or more datastores. The DBMS 268 may use any of a variety of database models (e.g., relational model, object model, etc.) and may support any of a variety of query languages.

The data storage 254 may additionally include various other program modules that may include computer-executable instructions for supporting a variety of associated functionality. For example, the data storage 254 may include one or more content management module(s) 270. The content management module 270 may include computer-executable instructions that in response to execution by the processor(s) 252 cause operations to be performed including receiving data from one or more content server(s) 106, receiving data from one or more user device(s) 104, receiving configuration information via a cloud-based web application or a user application 226, determining when to synchronize data received from the user device 104 to a content server(s) 106 or other cloud based server, determining when to expunge data based at least in part on configuration information (e.g., expunge the data from the device charger based at least in part on a predetermined time threshold) associated with a user account, and the like.

Within the data storage 254, one or more modules may be stored. As used herein, the term module may refer to a functional collection of instructions that may be executed by the one or more processor(s) 252. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

The network-enabled user device charger 108 may not be capable of providing any functionality not related to charging the user device 104 or transferring data between the user device and one or more server(s) 106. For example, the network-enabled user device charger 108 may not be capable of permitting a user 102 to check e-mail, browse the Internet, develop applications, or the like. Additionally, the network-enabled user device charger 108 may not be capable of providing any user interface, such as functionality related to presenting information on a display or receiving input directly from a user. In some embodiments, the network-enabled user device charger 108 may be configured by a user (e.g., settings and preferences), and websites or applications on other devices may create a user interface to allow a user to enter configuration information and then transmit the configuration to the network-enabled user device charger 108, but the network-enabled user device charger 108 itself may not provide any user interface.

The network-enabled user device charger 108 may not include common connectors (e.g., audio connectors, visual connectors, or the like). For example, the network-enabled user device charger 108 may not include an audio jack to enable a user to listen to any audio that may be stored on the network-enabled user device charger 108 or a video connector to enable a user 102 to connect the network-enabled user device charger 108 directly into a video-related display (e.g., monitor, television, etc.). In some implementations, the network-enabled user device charger 108 may contain only two connectors: a first connector for receiving power from a power source (e.g., a wall outlet) and a second connector 258 for connecting to a user device 104.

In some implementations, the network-enabled user device charger 108 may be compact enough to fit in a user's pocket so that it may be easily transported. Any connectors on the network-enabled user device charger 108 may fold into the body of the network-enabled user device charger 108 to enable a more compact profile. Examples of a format for a charging device may be found in U.S. patent application Ser. No. 14/075,503 filed on Nov. 8, 2013 and titled "Systems and Methods for a Power Adapter for Mobile Devices," which is incorporated herein by reference in its entirety.

Those of ordinary skill in the art will appreciate that any of the components of the system architecture 200 may include alternate and/or additional hardware, software, or firmware components beyond those described or depicted without departing from the scope of the disclosure. More particularly, it should be appreciated that hardware, software, or firmware components depicted or described as forming part of any of the illustrative components of the system architecture 200, and the associated functionality that such components support, are merely illustrative and that some components may not be present or additional components may be provided in various embodiments. While various program modules have been depicted and described with respect to various illustrative components of the system architecture 200, it should be appreciated that the functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of hardware, software, and/or firmware for implementing the functionality. Accordingly, it should be appreciated that the functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Further, while certain modules may be depicted and described as sub-modules of another module, in certain embodiments, such modules may be provided as independent modules.

Those of ordinary skill in the art will appreciate that the illustrative system architecture 200 is provided by way of example only. Numerous other operating environments, system architectures, and device configurations are within the scope of this disclosure. Other embodiments of the disclosure may include fewer or greater numbers of components and/or devices and may incorporate some or all of the functionality described with respect to the illustrative system architecture 200, or additional functionality.

Illustrative Processes

Figure 3:
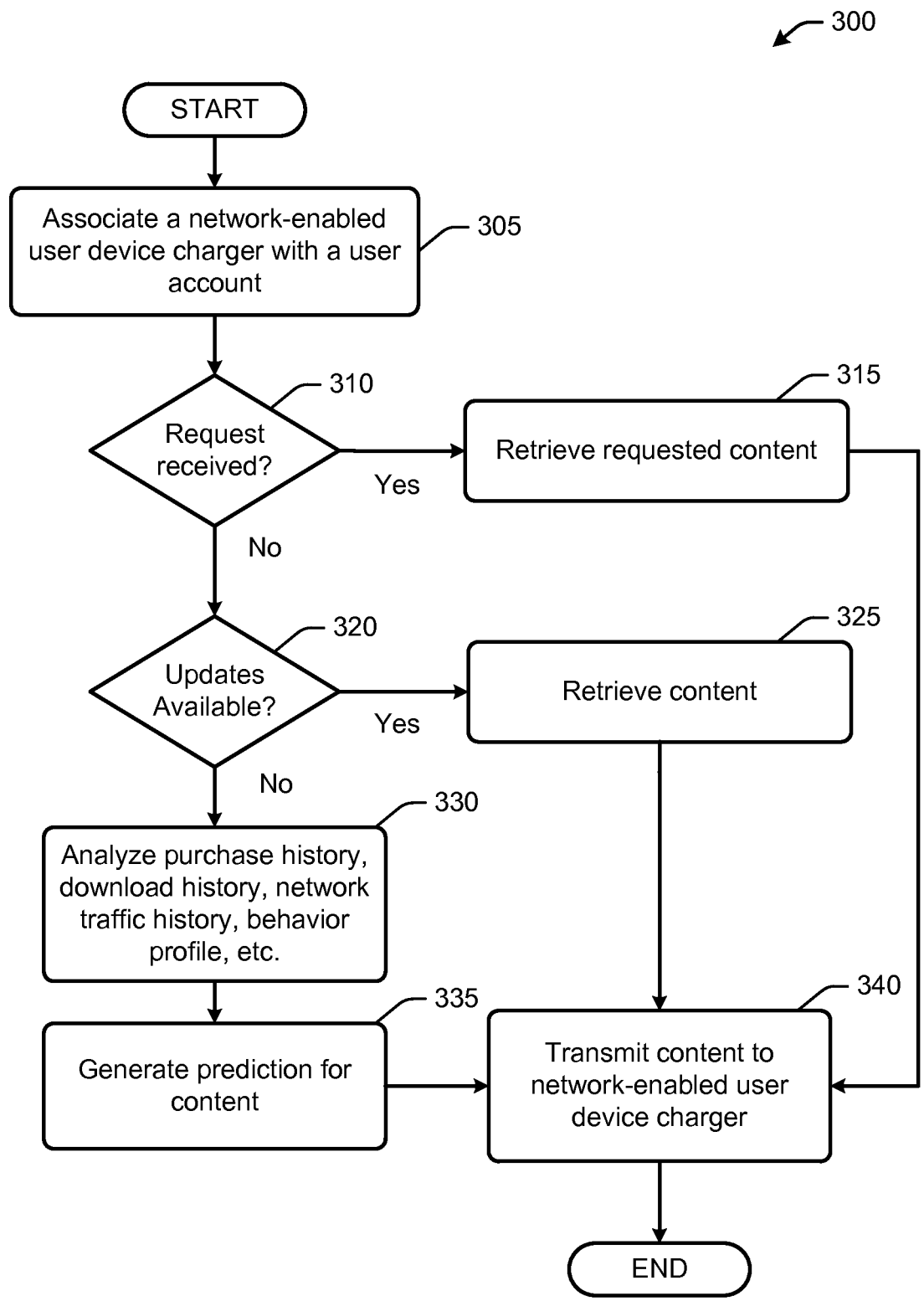
FIG. 3 is a process flow diagram of an illustrative method for determining content to provide to a network-enabled user device charger by a content server in accordance with one or more embodiments of the disclosure.

FIG. 3 is a process flow diagram of an illustrative method 300 for determining content 114 to transmit to a network-enabled user device charger 108 by a content server 106 in accordance with one or more embodiments of the disclosure. At block 305, a content server 108 may associate a network-enabled user device charger 108 with a user account. In some embodiments, the content server 108 may associate the network-enabled user device charger 108 with a user account based at least in part on configuration data received from a user 102. In some embodiments, the user may specify configuration data via a cloud-based web application and/or a user application 226 executing on a user device 104. Examples of configuration data may include one or more rules associated with the type of content that may be transmitted to the network-enabled user device charger 108 based on the associated user account, data throttle rules, time of data transfer preferences, synchronization preferences, types of metrics to capture and/or generate, and the like.

At block 310, the content distribution module 246 of the content server 106 may determine whether a request 110 was received from the user device 104. In some embodiments, the request 110 may include a request for content 114. In some embodiments, the request 110 may also include an indication that the content 114 does not need to be accessed immediately (e.g., the content 114 may be transmitted to the network-enabled user device charger 108 based on the configuration data associated with the user account). If at block 310, the content distribution module 246 determines that a request 110 was received, then at block 315, the content distribution module 246 may retrieve the requested content 114 based at least in part on the request 110. Then at block 340, the content distribution module 246 may transmit the content 114 to the network-enabled user device charger 108 associated with the user device 104 that generated the request 110.

If at block 310, the content distribution module 246 determines a request 110 for content 114 was not received from the user device 104, then at block 320, the content distribution module 246 may determine whether any content 114 associated with the user device 104 needs to be transmitted to the user device 104 (e.g., over the air (OTA) software updates for the user device 104). If the content distribution module 246 determines that content 114 associated with the user device 104 is available, then at block 325, the content distribution module 246 may retrieve the content 114 (e.g., OTA software updates for the user device 104). Then at block 340, the content distribution module 246 may transmit the content 114 to the network-enabled user device charger 108 associated with the user device 104 for transmission to the user device 104.

If at block 320, the content distribution module 246 determines that content associated with the user device 104 (e.g., software updates) are not available, then at block 330, the content distribution module 246 may analyze different data, including, but not limited to, purchase history associated with the user account, content download history associated with the user account, network traffic history associated with the user device 104, and/or a behavior profile associated with the user account. In some embodiments, the content distribution module 246 may analyze the data to identify patterns in type of content 114 or data transfer times associated with the user account.

At block 335, the content distribution module 246 may generate one or more predictions for content 114 (e.g., movies, music, games, e-books, software updates, etc.) based at least in part on the analysis of block 330. In some embodiments, the prediction may also include suggestions for time or day to transfer data to the network-enabled user device charger 108.

In some embodiments, the content distribution module 246 may generate a ranking to associate with content 114. The ranking may be based on user preferences, user behavior profile, and/or user download history. For example, the content distribution module 246 may identify three content items—a software update, a recent episode of a television series that the user 102 has recently viewed, and a movie based on predictions generated from analyzing information associated with the user 102. The content distribution module 246 may generate a ranking to associate with each of the content items. Based on an analysis of the user preferences and user behavior profile, and/or user download history, the content distribution module 246 may determine that the recent episode of the television series should be ranked first, the movie should be ranked second, and the software update ranked third. The ranking information may be transmitted to the network-enabled user device charger 108 with the content.

The content distribution module 246 may retrieve content 114 from one or more content datastores or other storage where content 114 may reside and, at block 340, transmit the content 114 to the network-enabled user device charger 108. In some embodiments, the content 114 may be transmitted to the network-enabled user device charger 108 via one or more networks 230, such as a cellular network.

In some embodiments, the user 102 may transmit a request 110 via a user device 104, for content 114. In some embodiments, there may not be an explicit request received from the user 102 for particular content 114.

In some embodiments, the content distribution module 246 may generate and transmit a notification 112 (e.g., email, system message, etc.) to the user device 104 indicating that the content 114 is available from the network-enabled user device charger 108 for download. In some embodiments, the notification 112 may be generated in response to receiving a request 110 for content 114 from the user device 104. In some embodiments, the network-enabled user device charger 108 may indicate content 114 is available for download to the user device 104 via an indicator 272 (e.g., visual or audio indicator).

Figure 4:
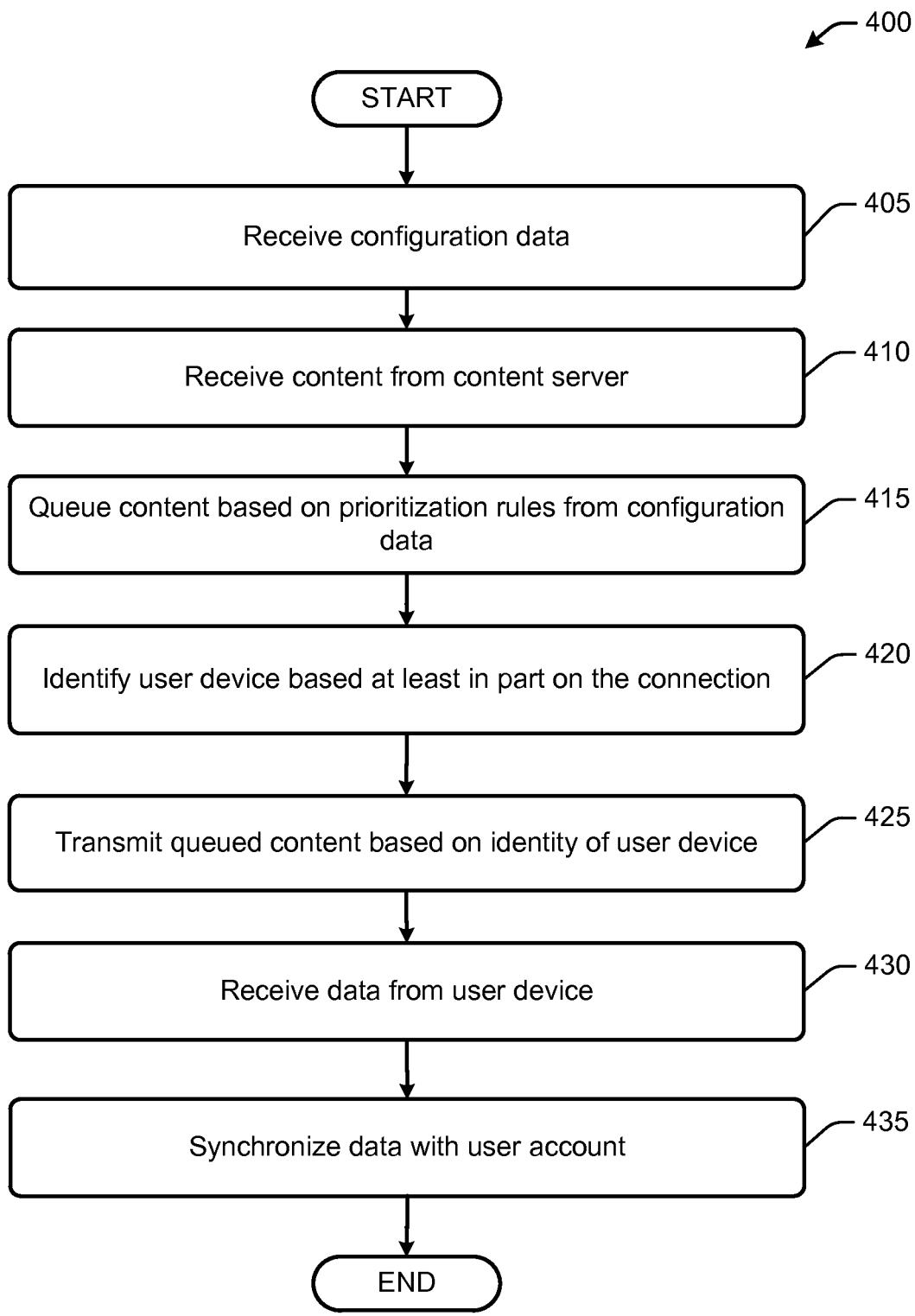
FIG. 4 is a process flow diagram of an illustrative method for data transfer management on a network-enabled user device charger in accordance with one or more embodiments of the disclosure.

FIG. 4 is a process flow diagram of an illustrative method 400 for data transfer management on a network-enabled user device charger 108 in accordance with one or more embodiments of the disclosure. At block 405, the network-enabled user device charger 108 may receive configuration data. In some embodiments, the configuration data may be received from a user 102 via a user application 226 executing on the user device 104 or a cloud-based web application accessed by the user 102 via a web browser 228 of the user device 104. The configuration data may include one or more user device profiles and rules associated with each of the user device profiles. In some embodiments, the rules may be directed at prioritization of content to transmit to the network-enabled user device charger 108 from the content server 106 (e.g., based on size of content 114, user behavior patterns, time of day, network traffic patterns, and the like) and/or prioritization of content to transmit from the network-enabled user device charger 108 to the user device (e.g., based on space availability of embedded storage of network-enabled user device charger 108, based on size of content 114, user behavior patterns, time of day, network traffic patterns, and the like). The content management module 270 may process the configuration data and update settings.

At block 410, the content management module 270 may receive content 114 from the content server 108. In some embodiments, the content 114 may be content 114 proactively identified by the content distribution module 246 of the content server 106 or may be content 114 that was requested by the user 102.

At block 415, the content management module 270 may queue content 114 to be transmitted to the network-enabled user device charger 108 based at least in part on the configuration data (e.g., prioritization rules). In some embodiments, the content management module 270 may identify the appropriate configuration settings associated with a user account associated with the received content and apply the configuration settings or rules based at least in part on the configuration data received. In some embodiments, the content management module 270 may queue content 114 to be transmitted to the network-enabled user device charger 108 based on additional factors. For example, the network-enabled user device charger 108 may identify a ranking associated with a content item received from the content server 106. As in the example described above, data received from the content server 106 may include a software update (e.g., ranked third), a television episode (e.g., ranked first), and a movie (e.g., ranked second). The content management module 270 may also analyze a user behavior profile associated with the user 102. For example, if it is 2:00 PM on a Friday afternoon, the user behavior profile may indicate that the user 102 typically does not connect his user device 104 to the network-enabled charger 108 for more than ten minutes. In such a situation, the content management module 270 may determine, based on the analysis, that if the user does connect the user device 104 to the network-enabled charger 108 on Friday afternoon at 2:00 PM, that the content management module 270 may assign a higher priority level to the software update, thus queuing the software update before the television episode based on the determination that despite the television episode ranking higher than the software update, based on the user behavior profile, it would be more efficient to transmit the software update when the network-enabled charger 108 is connected to the user device 104 on Friday afternoon.

At block 420, the content management module 270 may identify the user device 104 based at least in part on the connection to the network-enabled user device charger 108. In some embodiments, the content management module 270 may identify the user device 104 in response to the user device 104 being connected to the network-enabled user device charger 108 (e.g., connector 258) and a device profile which may have been received in association with the configuration data or may have been generated by the content management module 270 and stored in data storage 254. In some embodiments, the content management module 270 may transfer the queued content 114 to the user device 104 via the connector 258 upon identifying the user device 104 while the user device 104 is connected to the network-enabled user device charger 108 to be charged. In some embodiments, the content management module 270 may determine that the user device 104 is on the same wireless network 230 as the network-enabled user device charger 108 and may transmit the queued content 114 to the user device 104 over the wireless network 230 while the user device 104 is being charged.

At block 430, the content management module 270 may receive user content 116 (e.g., user-generated content, such as photos, videos, documents, etc.) from the user device 104. In some embodiments, the content management module 270 may receive content 116 from the user device 104 for synchronization with other devices associated with the user account and/or the content server 108 in association with the user account. In some embodiments, the content management module 270 may determine when is an optimal (e.g., non-peak time based on user behavior, network traffic, etc.) time to transmit the user content 116 received from the user device 104 to other devices and/or content server 106 for synchronization. At block 435, the content management module 270 may facilitate synchronization of the user content 116 with the user account.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A WiFi-enabled user device charger comprising:
    a processor;
    a WiFi antenna;
    a connector for receiving power;
    a user device charging and data transmission connector;
    a memory storing computer-executable instructions configuring the processor to:
        connect to a server using the WiFi antenna to fetch first data for transmitting to a user device;
        queue a portion of the first data to transfer to the user device;
        determine a priority associated with the portion of the first data, wherein the priority is received from the server and is based at least in part on a likelihood the first data will be consumed by the user device;
        select the portion of the first data for transfer to the user device based at least in part on the priority;
        determine that the user device is connected to the WiFi-enabled user device charger;
        transmit the portion of the first data to the user device using the user device charging and data transmission connector;
        transfer power to the user device using the user device charging and data transmission connector; and
        receive second data from the user device via the user device charging and data transmission connector; and
        transfer a portion of the second data to the server using the WiFi antenna; and
    wherein the WiFi-enabled user device charger does not provide any functionality that is not related to charging the user device or transferring data between the user device and the server.

2. The WiFi-enabled user device charger of claim 1, wherein the memory further stores computer-executable instructions configuring the processor to:
    determine that the user device has been disconnected from the WiFi-enabled user device charger;
    determine that a second user device is connected to the WiFi-enabled user device charger;
    connect to the server using the WiFi antenna to fetch third data for transmitting to the second user device;
    queue a portion of the third data to transfer to the second user device;
    transmit the portion of the third data to the second user device using the user device charging and data transmission connector; and
    transfer power to the second user device using the user device charging and data transmission connector.

3. The WiFi-enabled user device charger of claim 1, wherein the memory further stores computer-executable instructions configuring the processor to:
    determine an identifier of a network to which the WiFi-enabled user device charger is connected; and
    wherein the portion of the first data is determined using the identifier of the network.

4. A network-enabled user device charger comprising:
    a processor;
    a WiFi antenna;
    a first connector for receiving power;
    a second connector for connecting to a user device; and
    a memory storing computer-executable instructions configuring the processor to:
        connect to a server over a network using the WiFi antenna to download first data for a user device;
        determine that the user device is connected to the network-enabled user device charger via the second connector;
        queue a portion of the first data to transfer to the user device;
        determine a priority associated with the portion of the first data, wherein the priority is received from the server and is based at least in part on a likelihood the first data will be consumed by the user device;
        select the portion of the first data for transfer to the user device based at least in part on the priority;
        transfer power to the user device via the second connector;
        transfer a portion of the first data to the user device via the second connector;
        receive second data from the user device via the second connector;
        transfer a portion of the second data to the server using the antenna; and
    wherein the network-enabled user device charger is not capable of presenting information on a display.

5. The network-enabled user device charger of claim 4, wherein the memory further stores computer-executable instructions configuring the processor to:

determine an identifier of a network to which the network-enabled user device charger is connected; and wherein the portion of the first data is determined using the identifier of the network.

6. The network-enabled user device charger of claim 4, wherein the second connector is a universal serial bus (USB) connector.

7. The network-enabled user device charger of claim 4, wherein the first data comprises at least one of a software update, a video file, an audio file, a video, a game, or a document.

8. The network-enabled user device charger of claim 4, wherein the second data comprises at least one of a photograph, a video file, an audio file, or a document.

9. The network-enabled user device charger of claim 4, wherein the memory further stores computer-executable instructions configuring the processor to:

determine the user device is disconnected from the network-enabled user device charger;

connect to a server over the network using the WiFi antenna to download third data for a second user device;

determine that the second user device is connected to the network-enabled user device charger via the second connector;

transfer power to the second user device via the second connector;

transfer a portion of the third data to the second user device via the second connector;

receive fourth data from the second user device via the second connector; and transfer a portion of the fourth data to the server using the antenna.

10. The network-enabled user device charger of claim 4, further comprising a visual indicator indicating that data is available for download to the user device, wherein the visual indicator is a light-emitting diode (LED).

11. A network-enabled user device charger, comprising:
a processor;
a WiFi antenna;
a first connector for receiving power;
a second connector for connecting to a user device; and
a memory storing computer-executable instructions configuring the processor to:
connect to a server using the WiFi antenna to download first data for a user device;
determine that the user device is connected to the network-enabled user device charger via the second connector;
queue a portion of the first data to transfer to the user device;

determine a priority associated with the portion of the first data, wherein the priority is received from the server and is based at least in part on a likelihood the first data will be consumed by the user device;

select the portion of the first data for transfer to the user device based at least in part on the priority;

transfer power to the user device via the second connector;

receive second data from the user device via the second connector;

transfer a portion of the first data to the user device via the second connector; and wherein the network-enabled user device charger does not have any connectors other than the first connector and the second connector.

12. The network-enabled user device charger of claim 11, wherein the memory further stores computer-executable instructions configuring the processor to:

receive second data from the user device via the second connector; and transfer a portion of the second data to the server using the WiFi antenna.

13. The network-enabled user device charger of claim 11, wherein the memory further stores computer-executable instructions configuring the processor to:

determine a ranking associated with the first data; and
select the portion of the first data using the ranking.

14. The network-enabled user device charger of claim 11, wherein the memory further stores computer-executable instructions configuring the processor to:

determine that an amount of available storage on the network-enabled user device charger has reached a threshold;

identify second data stored on the network-enabled user device charger for deletion; and delete the second data.

15. The network-enabled user device charger of claim 11, wherein the server predicts data likely to be consumed by the user device based on other content consumed by the user device.

16. The network-enabled user device charger of claim 11, wherein the second connector is a universal serial bus (USB) connector.

17. The network-enabled user device charger of claim 11, wherein the memory further stores computer-executable instructions configuring the processor to:

determine a priority associated with the portion of the first data; and select the portion of the first data for transfer to the user device based at least in part on the priority.

* * * * *